(12) United States Patent
Song

(10) Patent No.: US 12,673,525 B2
(45) Date of Patent: Jul. 7, 2026

(54) LEAF SPRING DEVICE FOR SUSPENSION SYSTEM FOR VEHICLE

(71) Applicant: HYUNDAI MOBIS Co., Ltd., Seoul (KR)

(72) Inventor: Woo Bin Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 462 days.

(21) Appl. No.: 18/086,117

(22) Filed: Dec. 21, 2022

(65) Prior Publication Data

US 2023/0391155 A1     Dec. 7, 2023

(30) Foreign Application Priority Data

Jun. 7, 2022     (KR) ........................ 10-2022-0068670

(51) Int. Cl.
B60G 11/02          (2006.01)

(52) U.S. Cl.
CPC .......... B60G 11/02 (2013.01); B60G 2202/11 (2013.01); B60G 2204/121 (2013.01); B60G 2204/43 (2013.01); B60G 2206/428 (2013.01); B60G 2206/7101 (2013.01)

(58) Field of Classification Search
CPC ............ B60G 11/02; B60G 2206/7101; B60G 2206/428; B60G 2204/43; B60G 2204/121; B60G 2202/11
See application file for complete search history.

(56) References Cited

U.S. PATENT DOCUMENTS

| | | | | |
|---|---|---|---|---|
| 1,661,530 | A | * | 3/1928 | Field .................... B60G 11/107 267/267 |
| 4,781,364 | A | * | 11/1988 | Finn ...................... F16F 1/3686 267/260 |
| 4,969,634 | A | * | 11/1990 | Bellingham .......... F16F 1/3686 267/260 |
| 9,115,778 | B2 | * | 8/2015 | Wagner ................. F16F 7/123 |
| 9,656,528 | B2 | * | 5/2017 | Perri .................... B60G 15/068 |
| 9,724,975 | B2 | * | 8/2017 | Krahn ................... B60G 7/008 |
| 10,065,470 | B2 | * | 9/2018 | Son ........................ B60G 5/047 |
| 11,890,906 | B2 | * | 2/2024 | Kim ...................... F16F 1/3683 |
| 12,117,063 | B2 | * | 10/2024 | Ruiz Dealbert ...... B29C 70/302 |
| 12,246,566 | B2 | * | 3/2025 | Song ......................... F16F 1/30 |
| 2003/0122293 | A1 | * | 7/2003 | Akhtar ..................... F16F 1/22 267/36.1 |
| 2003/0222387 | A1 | * | 12/2003 | Yokoyama .............. F16F 1/182 267/260 |
| 2008/0252033 | A1 | * | 10/2008 | Platner ................... B60G 11/10 267/239 |

(Continued)

FOREIGN PATENT DOCUMENTS

| | | | |
|---|---|---|---|
| DE | 3613804 | C1 * | 7/1987 |
| DE | 4038429 | A1 * | 6/1992 |
| KR | 10-1526709 | B1 | 6/2015 |

*Primary Examiner* — Vishal R Sahni
(74) *Attorney, Agent, or Firm* — Morgan, Lewis & Bockius LLP

(57)          ABSTRACT

A leaf spring device for a suspension system for a vehicle according to the present disclosure may include a center leaf spring, side leaf springs respectively disposed at two opposite sides of the center leaf spring, and bracket modules each including a center bracket configured to accommodate an end of the center leaf spring, and a side bracket connected to the center bracket and configured to accommodate an end of the side leaf spring.

16 Claims, 7 Drawing Sheets

(56) References Cited

U.S. PATENT DOCUMENTS

| 2012/0146308 | A1* | 6/2012 | Fruhmann | F16F 1/3683 |
| | | | | 280/124.175 |
| 2013/0241167 | A1* | 9/2013 | Perri | B60G 11/10 |
| | | | | 280/124.134 |
| 2019/0061454 | A1* | 2/2019 | Rochell | B60G 11/10 |
| 2019/0241036 | A1* | 8/2019 | Winter | B60G 7/02 |
| 2020/0353785 | A1* | 11/2020 | Cho | B60G 11/10 |
| 2021/0162825 | A1* | 6/2021 | Senoo | B60G 7/001 |
| 2021/0268856 | A1* | 9/2021 | Winter | B60G 3/10 |
| 2021/0379948 | A1* | 12/2021 | Rosenmeyer | B60G 3/10 |
| 2023/0166573 | A1* | 6/2023 | Kim | F16F 3/023 |
| | | | | 280/124.171 |
| 2023/0391155 | A1* | 12/2023 | Song | B60G 11/10 |

* cited by examiner

FIG. 4

LEAF SPRING DEVICE FOR SUSPENSION SYSTEM FOR VEHICLE

CROSS-REFERENCE TO RELATED APPLICATION

This application claims the benefit under 35 U.S.C. § 119(a) of priority to Korean Patent Application No. 10-2022-0068670 filed on Jun. 7, 2022 in the Korean Intellectual Property Office, the entire disclosure of which is incorporated herein by reference for all purposes.

BACKGROUND

Field

Exemplary embodiments of the present disclosure relate to a leaf spring device for a suspension system for a vehicle, and more particularly, to a leaf spring device for a suspension system for a vehicle, which is capable of improving durability of a spring part.

Discussion of the Background

A suspension system for a vehicle refers to a device that supports a vehicle body by using a function of a spring, mitigates vertical vibration of a vehicle wheel to improve ride quality, and prevents damage to luggage caused by impact.

A leaf spring is mainly applied as the spring for the suspension system for a vehicle, and the leaf spring made of a composite material is connected by a bracket made of a metallic material. In the related art, the leaf spring is assembled to the bracket by bolting or the like. Because the leaf spring and the bracket, which are made of different types of materials, are connected by bolting, there are problems in that the material of the spring is damaged, and a hole portion of the spring is vulnerable to durability. Therefore, there is a need to solve the problems.

The background technology of the present disclosure is disclosed in Korean Patent No. 10-1526709 (registered on Jun. 1, 2015, and entitled 'Suspension System for Commercial Vehicle').

SUMMARY

Various embodiments are directed to a leaf spring device for a suspension system for a vehicle, which is capable of improving durability of a spring part.

In an embodiment, a leaf spring device for a suspension system for a vehicle includes: a center leaf spring; side leaf springs respectively disposed at two opposite sides of the center leaf spring; and bracket modules each including a center bracket configured to accommodate an end of the center leaf spring, and a side bracket connected to the center bracket and configured to accommodate an end of the side leaf spring.

In the present disclosure, the center bracket may include: a center bracket body connected to the side bracket; a center accommodation part disposed on the center bracket body and configured to accommodate the center leaf spring, the center accommodation part having a first side opened so that the center leaf spring is inserted into the center accommodation part; a center shim accommodated in the center accommodation part and configured to adjoin the center leaf spring; and a center cover coupled to the center accommodation part to close the first side of the center accommodation part.

In the present disclosure, the center bracket may further include a center shim fastening part configured to penetrate the center accommodation part and be fastened to the center shim so that the center shim presses the center leaf spring.

In the present disclosure, the center accommodation part may include: a center upper plate; a center lower plate disposed to be spaced apart from the center upper plate; and a center connection plate configured to connect the center upper plate and the center lower plate, and the center shim may be disposed on the center lower plate.

In the present disclosure, an interval between an upper surface of the center shim and a lower surface of the center upper plate may be smaller at an inlet of the center accommodation part than at an inner side of the center accommodation part.

In the present disclosure, a vertical thickness of a portion of the center leaf spring, which is adjacent to the inner side of the center accommodation part, may be larger than a vertical thickness of a portion of the center leaf spring that is adjacent to the inlet of the center accommodation part.

In the present disclosure, a vertical thickness of a portion of the center shim, which is adjacent to the inlet of the center accommodation part, may be larger than a vertical thickness of a portion of the center shim that is adjacent to the inner side of the center accommodation part.

In the present disclosure, the center bracket may further include a center stopper formed on the center connection plate and configured to prevent the center leaf spring from moving toward an inner side of the center accommodation part.

In the present disclosure, the center stopper may include: a center protrusion protruding from the center connection plate toward the center leaf spring; and center grooves respectively formed in a connection portion between the center upper plate and the center connection plate and a connection portion between the center lower plate and the center connection plate.

In the present disclosure, the side bracket may include: a side bracket body connected to the center bracket; a side accommodation part disposed on the side bracket body and configured to accommodate the side leaf spring, the side accommodation part having a first side opened so that the side leaf spring is inserted into the side accommodation part; a side shim accommodated in the side accommodation part and configured to adjoin the side leaf spring; and a side cover coupled to the side accommodation part to close the first side of the side accommodation part.

In the present disclosure, the side bracket may further include a side shim fastening part configured to penetrate the side accommodation part and be fastened to the side shim so that the side shim presses the side leaf spring.

In the present disclosure, the side accommodation part may include: a side upper plate; a side lower plate disposed to be spaced apart from the side upper plate; and a side connection plate configured to connect the side upper plate and the side lower plate, and the side shim may be disposed on the side lower plate.

In the present disclosure, an interval between an upper surface of the side shim and a lower surface of the side upper plate may be smaller at an inlet of the side accommodation part than at an inner side of the side accommodation part.

In the present disclosure, a vertical thickness of a portion of the side leaf spring, which is adjacent to the inner side of the side accommodation part, may be larger than a vertical thickness of a portion of the side leaf spring that is adjacent to the inlet of the side accommodation part.

In the present disclosure, a vertical thickness of a portion of the side shim, which is adjacent to the inlet of the side accommodation part, may be larger than a vertical thickness of a portion of the side shim that is adjacent to the inner side of the side accommodation part.

In the present disclosure, the side bracket may further include a side stopper formed on the side connection plate and configured to prevent the side leaf spring from moving toward an inner side of the side accommodation part.

In the present disclosure, the side stopper may include: a side protrusion protruding from the side connection plate toward the side leaf spring; and side grooves respectively formed in a connection portion between the side upper plate and the side connection plate and a connection portion between the side lower plate and the side connection plate.

In the present disclosure, at least any one of the center leaf spring and the side leaf spring may include glass fiber reinforced plastic (GFRP).

According to the leaf spring device for a suspension system for a vehicle according to the embodiment of the present disclosure, the center bracket for supporting the end of the center leaf spring and the side bracket for supporting the end of the side leaf spring may reduce damage to the center leaf spring and the side leaf spring.

In addition, according to the present disclosure, no hole is formed in the center leaf spring and the side leaf spring, which makes it possible to improve durability of the center leaf spring and the side leaf spring.

BRIEF DESCRIPTION OF THE DRAWINGS

FIG. 4 is a partially enlarged front view schematically illustrating part "B" in FIG. 2.

DETAILED DESCRIPTION OF THE ILLUSTRATED EMBODIMENTS

Figure 1:
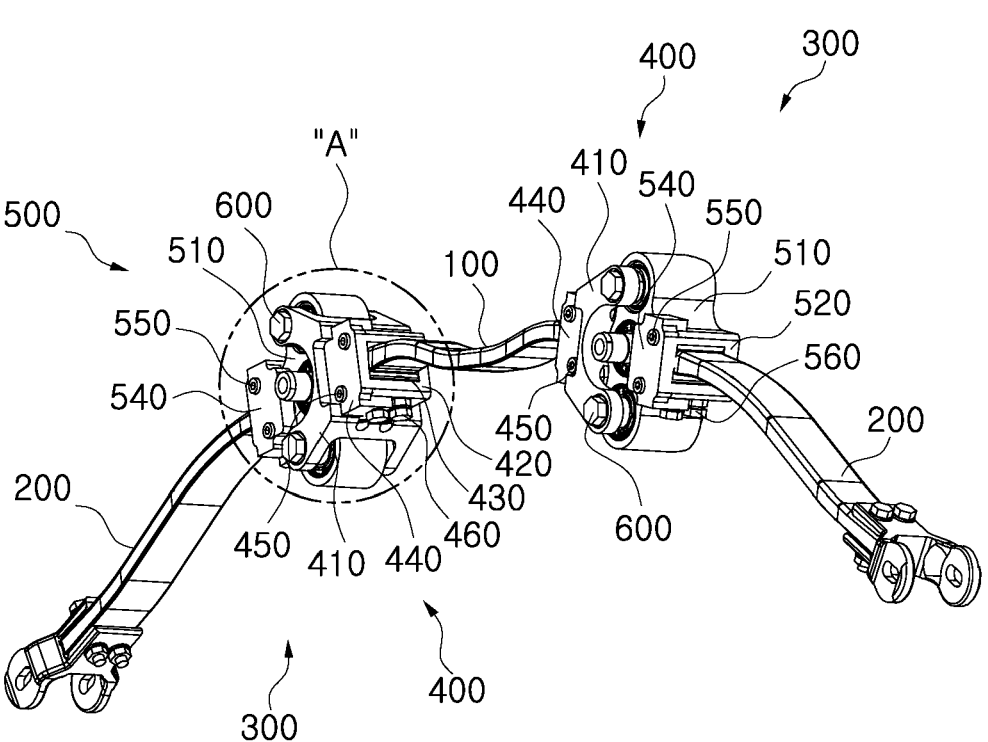
FIG. 1 is a perspective view schematically illustrating a leaf spring device for a suspension system for a vehicle according to an embodiment of the present disclosure.

Hereinafter, a leaf spring device for a suspension system for a vehicle will be described below with reference to the accompanying drawings through various exemplary embodiments. Here, thicknesses of lines, sizes of constituent elements, or the like illustrated in the drawings, may be exaggerated for clarity and convenience of description.

In addition, the terms used below are defined in consideration of the functions thereof in the present disclosure and may vary depending on the intention of a user or an operator or a usual practice. Therefore, such terms should be defined based on the entire contents of the present specification.

Figure 2:
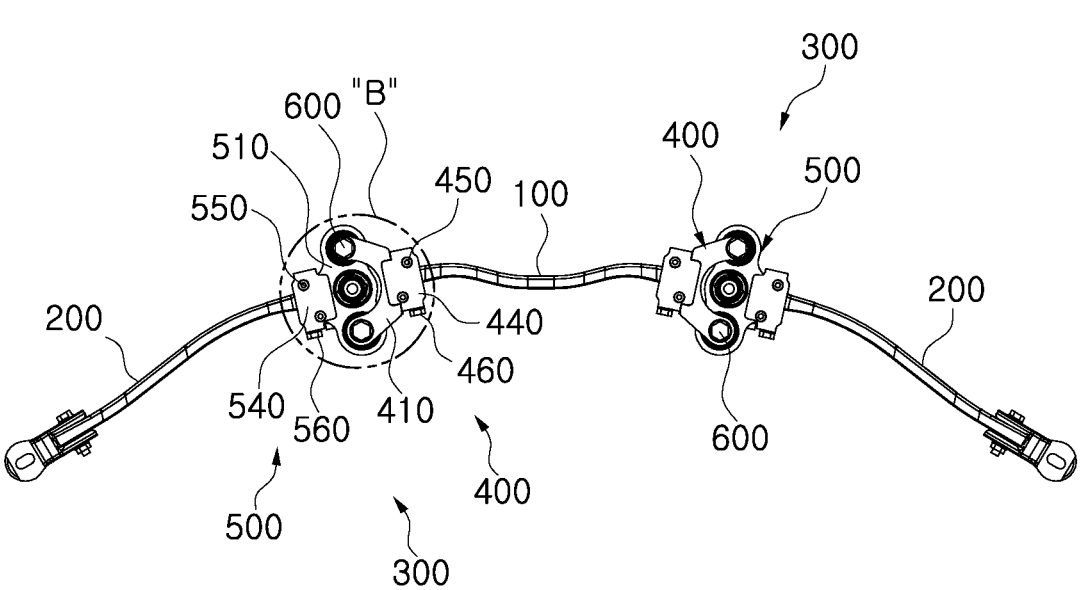
FIG. 2 is a front view schematically illustrating the leaf spring device for a suspension system for a vehicle according to the embodiment of the present disclosure.
Figure 3:
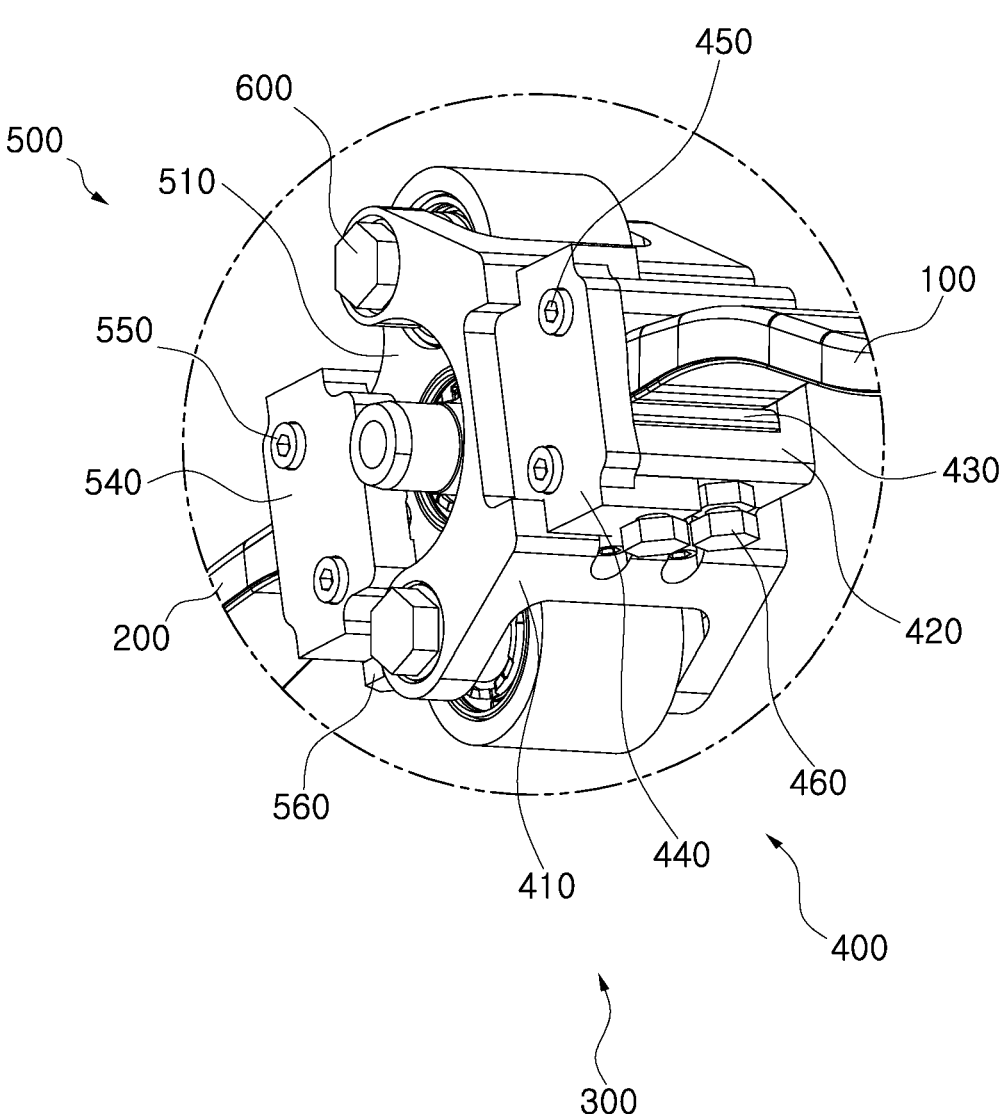
FIG. 3 is a partially enlarged perspective view schematically illustrating part "A" in FIG. 1.
Figure 4:
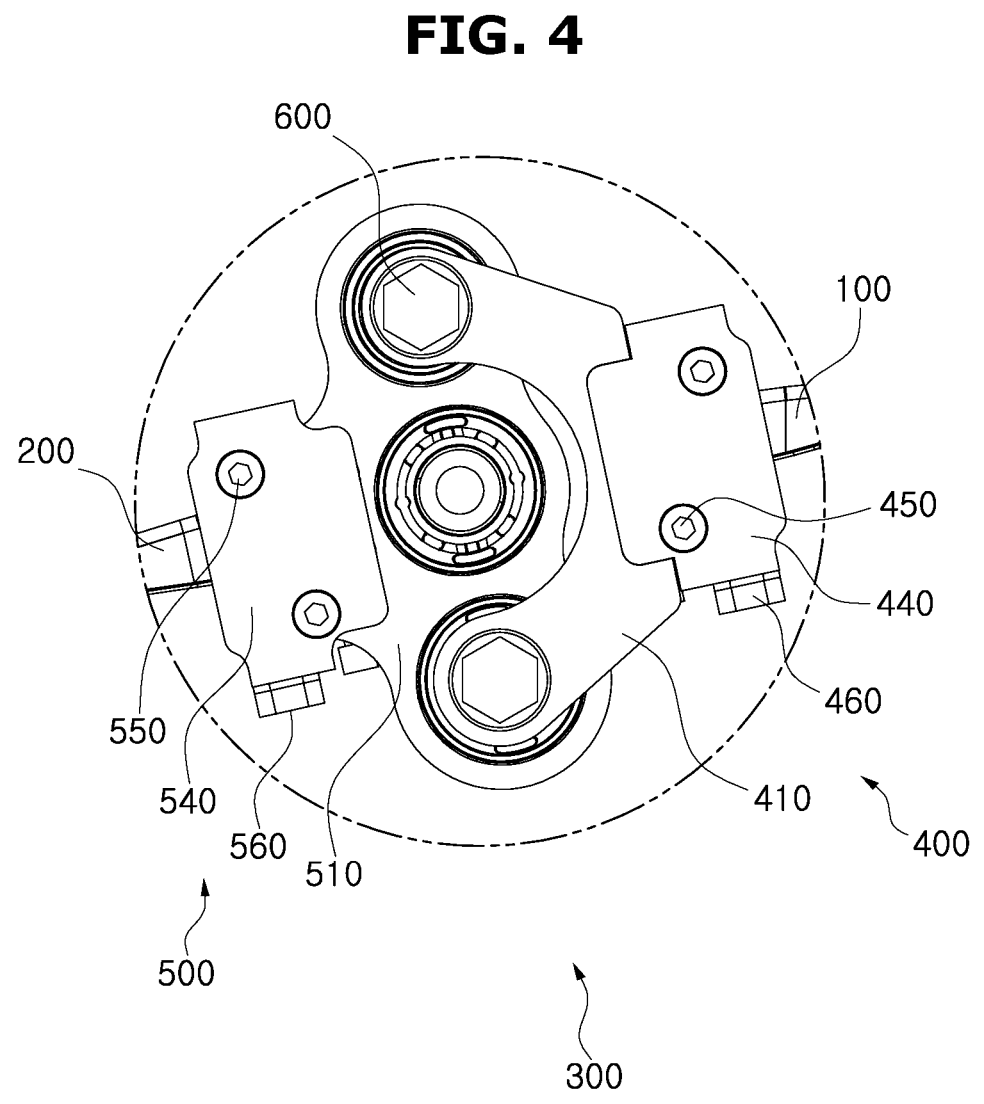
Figure 5:
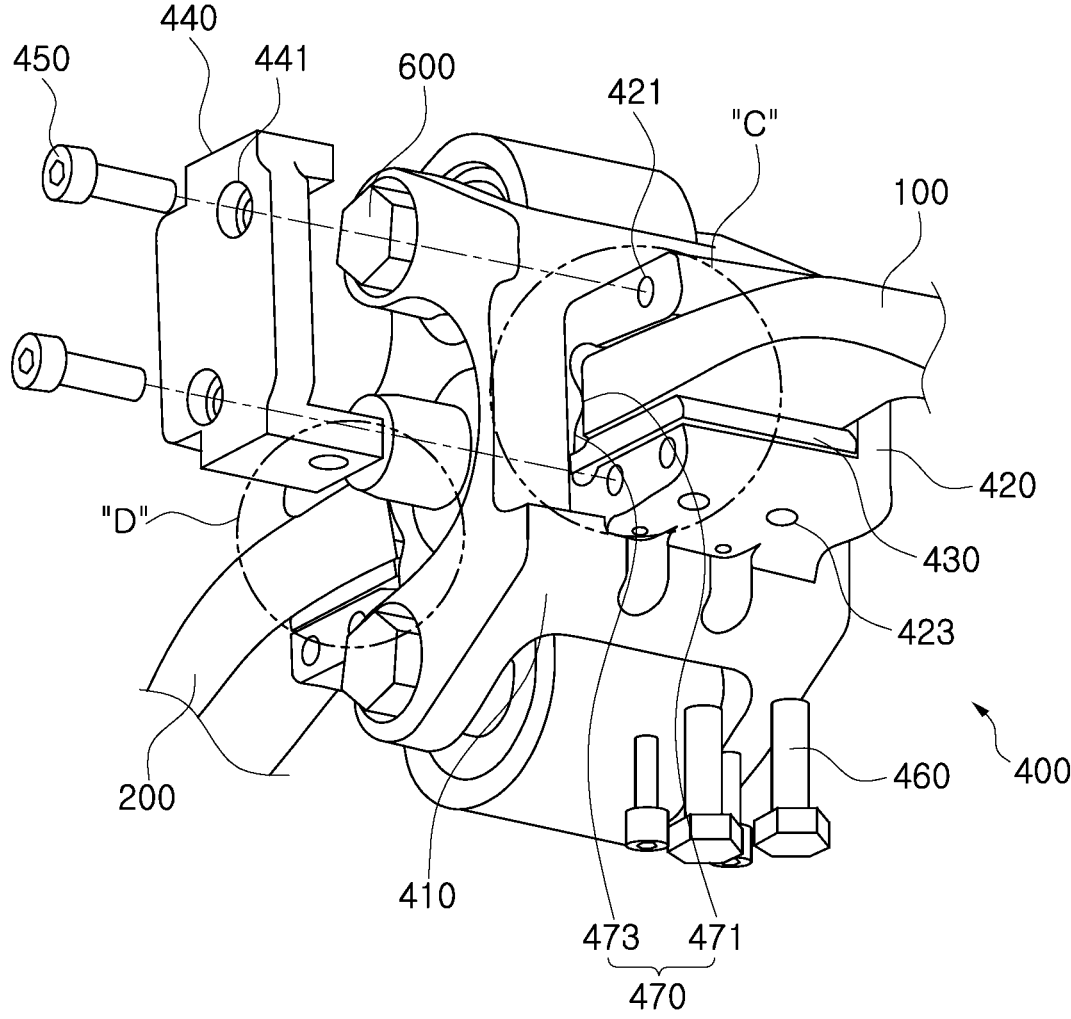
FIG. 5 is an assembled perspective view schematically illustrating a main configuration of the leaf spring device for a suspension system for a vehicle according to the embodiment of the present disclosure.
Figure 6:
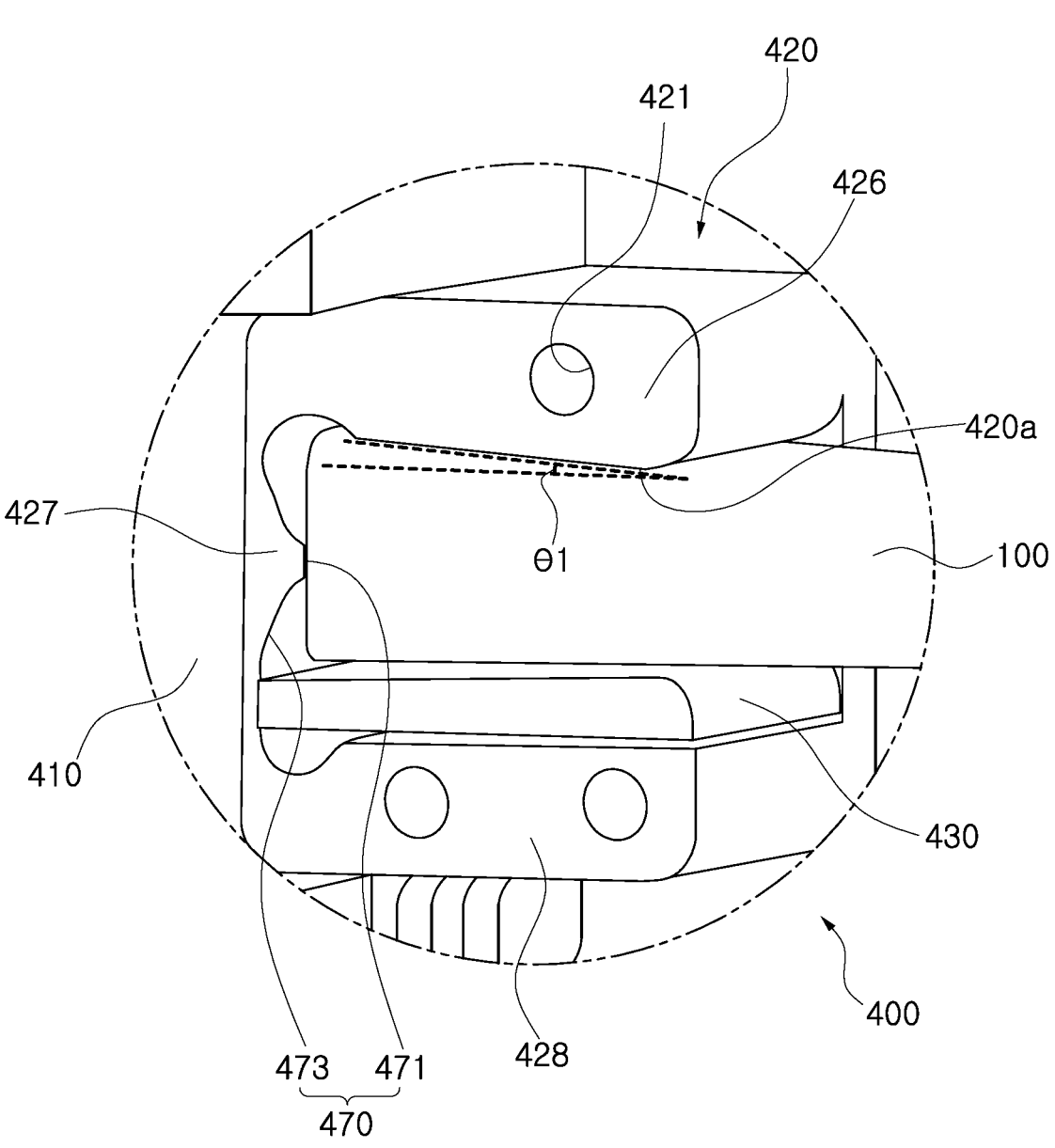
FIG. 6 is a partially enlarged perspective view schematically illustrating part "C" in FIG. 5.
Figure 7:
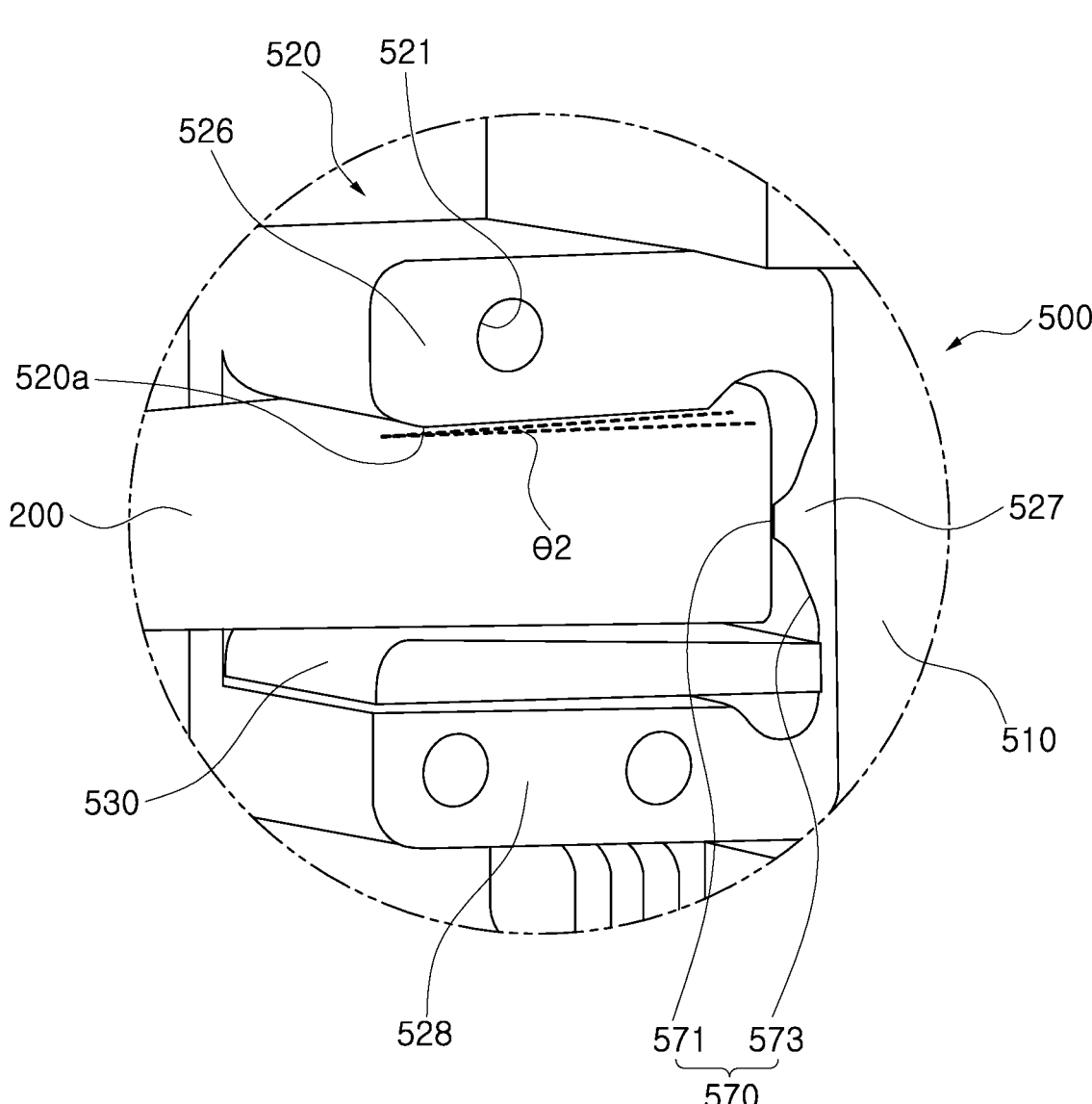
FIG. 7 is a partially enlarged perspective view schematically illustrating part "D" in FIG. 5.

FIG. 1 is a perspective view schematically illustrating a leaf spring device for a suspension system for a vehicle according to an embodiment of the present disclosure, FIG. 2 is a front view schematically illustrating the leaf spring device for a suspension system for a vehicle according to the embodiment of the present disclosure, FIG. 3 is a partially enlarged perspective view schematically illustrating part "A" in FIG. 1, FIG. 4 is a partially enlarged front view schematically illustrating part "B" in FIG. 2, FIG. 5 is an assembled perspective view schematically illustrating a main configuration of the leaf spring device for a suspension system for a vehicle according to the embodiment of the present disclosure, FIG. 6 is a partially enlarged perspective view schematically illustrating part "C" in FIG. 5, and FIG. 7 is a partially enlarged perspective view schematically illustrating part "D" in FIG. 5.

Referring to FIGS. 1 to 7, the leaf spring device for a suspension system for a vehicle according to the embodiment of the present disclosure includes a center leaf spring 100, side leaf springs 200, and bracket modules 300.

The center leaf spring 100 may be connected to the side leaf spring 200 through the bracket module 300.

The side leaf springs 200 may be respectively disposed at two opposite sides of the center leaf spring 100. In the present embodiment, an example will be described in which the leaf spring device for a suspension system for a vehicle includes one center leaf spring 100 and two side leaf springs 200, but the present disclosure is not limited thereto. The leaf spring device may include one center leaf spring 100 and one side leaf spring 200.

The center leaf spring 100 may include a composite material. For example, the center leaf spring 100 may include a glass fiber reinforced plastic (GFRP) material. The center leaf spring 100 made of a composite material may allow the leaf spring device for a suspension system for a vehicle to have excellent corrosion resistance and a reduced weight and improve fuel economy of a vehicle.

The side leaf spring 200 may include a composite material. For example, the side leaf spring 200 may include a glass fiber reinforced plastic (GFRP) material. The side leaf spring 200 made of a composite material may allow the leaf spring device for a suspension system for a vehicle to have excellent corrosion resistance and a reduced weight and improve fuel economy of a vehicle.

The bracket modules 300 may be equal in number to the side leaf springs 200. In the present embodiment, the two side leaf springs 200 are provided, such that two bracket modules 300 are provided.

The bracket modules 300 may each include a center bracket 400 and a side bracket 500. The center bracket 400 accommodates the center leaf spring 100, and the side bracket 500 accommodates the side leaf spring 200.

The center bracket 400 accommodates an end of the center leaf spring 100. In the present embodiment, two opposite ends of the center leaf spring 100 are respectively accommodated in the center brackets 400.

The side bracket 500 may be separably connected to the center bracket 400. The side bracket 500 accommodates an end of the side leaf spring 200.

The center bracket 400 and the side bracket 500 may be coupled by fastening parts 600. Therefore, the center bracket 400 and the side bracket 500 may be separated as the fastening part 600 is released. The fastening part 600 may have a bolt and a nut, but the present disclosure is not limited thereto. The fastening part 600 may be configured as other members as long as the fastening part 600 may fasten the center bracket 400 and the side bracket 500.

Referring to FIGS. 1 and 2, in the present embodiment, the center leaf spring 100 is connected to the side leaf spring 200 through the bracket module 300.

The bracket modules 300 may be respectively disposed at the two opposite ends of the center leaf spring 100. The side leaf springs 200 respectively disposed at the two opposite sides of the center leaf spring 100 are connected to the center leaf spring 100 by the bracket modules 300. Referring to FIG. 2, the bracket modules 300 and the side leaf springs 200 are respectively disposed at left and right sides based on the center leaf spring 100, one bracket module 300 and one side leaf spring 200 for each of the left and right sides based on the center leaf spring 100.

The center bracket 400 and the side bracket 500 may each include a metallic material. The center bracket 400 and the side bracket 500 may each include aluminum that is light metal.

As illustrated in FIG. 2, the two bracket modules 300 may be disposed to be vertically symmetric with respect to the center leaf spring 100. Hereinafter, the description will be made with reference to the bracket module 300 disposed at the left side of FIG. 2.

Referring to FIGS. 3 to 6, the center bracket 400 may include a center bracket body 410, a center accommodation part 420, a center shim 430, and a center cover 440.

The center bracket body 410 is connected to the side bracket 500. The center bracket body 410 may be separably coupled to the side bracket body 510 by the fastening part 600.

The center accommodation part 420 may be provided on the center bracket body 410. The center accommodation part 420 may be integrated with the center bracket body 410. The center accommodation part 420 may be manufactured separately from the center bracket body 410 and then separably coupled to the center bracket body 410.

The center accommodation part 420 may be disposed on a portion of the center bracket body 410 directed toward center leaf spring 100. Therefore, based on FIG. 2, the center accommodation part 420 is disposed at a right side of the center bracket body 410 of the center bracket 400 at the left side, and the center accommodation part 420 is disposed at a left side of the center bracket body 410 of the center bracket 400 at the right side.

The center accommodation part 420 has therein a space that accommodates an end (a left end based on FIG. 6) of the center leaf spring 100.

The center accommodation part 420 has a first side (a front side based on FIG. 6) opened so that the center leaf spring 100 is inserted into the center accommodation part 420. Therefore, the center leaf spring 100 may be inserted into the center accommodation part 420 through the first side of the center accommodation part 420. A side (a rear side based on FIG. 6) of the center accommodation part 420 opposite to the first side is closed. Therefore, a further movement of the center leaf spring 100 inserted into the center accommodation part 420 is blocked by the side opposite to the first side.

The center accommodation part 420 has a second side (a right side based on FIG. 6) directed toward the center leaf spring 100, and the second side is opened. Therefore, the remaining portion of the center leaf spring 100 may be disposed to protrude outward from the center accommodation part 420 in the state in which the end of the center leaf spring 100 is accommodated in the center accommodation part 420. A side (a left side based on FIG. 6) of the center accommodation part 420 opposite to the second side is closed. Therefore, an excessive movement of the center leaf spring 100 inserted into the center accommodation part 420 is blocked by the side opposite to the second side.

The center accommodation part 420 may have a cross-sectional shape taken in the upward/downward direction, and the cross-sectional shape may be an approximately "⌐" shape. The center accommodation part 420 may include a center upper plate 426, a center lower plate 428 disposed to be spaced apart from the center upper plate 426, and a center connection plate 427 configured to connect the center upper plate 426 and the center lower plate 428.

The center upper plate 426 extends outward from an upper portion of the center connection plate 427, and the center lower plate 428 extends outward from a lower portion of the center connection plate 427. The center upper plate 426 and the center lower plate 428 may be disposed to be approximately parallel to each other and inclined at a predetermined angle.

The center bracket 400 may further include first center fastening parts 450 and center shim fastening parts 460. First center fastening holes 421 may be formed in the first side of the center accommodation part 420 and screw-fastened to the first center fastening parts 450. Second center through-holes 423 may be formed in a lower surface of the center accommodation part 420, and the center shim fastening parts 460 may be inserted into the second center through-holes 423.

The center leaf spring 100 is inserted into the opened first side of the center accommodation part 420, such that the center leaf spring 100 is accommodated in the center accommodation part 420.

The center shim 430 is accommodated in the center accommodation part 420 so as to be in contact with a lower surface of the center leaf spring 100. The center shim 430 is disposed on the center lower plate 428 of the center accommodation part 420. That is, when the center leaf spring 100 and the center shim 430 are accommodated in the center accommodation part 420, the center shim 430 is disposed on the center lower plate 428 of the center accommodation part 420, and the center leaf spring 100 is disposed on the center shim 430. An upper surface of the center leaf spring 100 adjoins a lower surface of the center upper plate 426 of the center accommodation part 420.

Center shim fastening holes (not illustrated) may be formed in the center shim 430 and disposed to overlap the second center through-holes 423 of the center accommodation part 420, and the center shim fastening parts 460 may be screw-fastened to the center shim fastening holes. A screw thread may be formed on an inner peripheral surface of the center shim fastening hole of the center shim 430 and screw-fastened to the center shim fastening part 460.

The center shim 430 inserted and mounted into the center accommodation part 420 is fastened to the center shim fastening parts 460, such that the center leaf spring 100 may be stably accommodated in the center accommodation part 420 without a through-hole.

A pressing force of the center shim 430 fastened to the center shim fastening parts 460 fixes a position of the center leaf spring 100 in the center accommodation part 420 while restricting the upward/downward movement of the center leaf spring 100 in the center accommodation part 420.

Therefore, the center leaf spring 100 may be fixed in position in the center accommodation part 420 without being coupled directly to the center shim fastening part 460, such that a separate shape such as a fastening hole or a fastening groove need not be provided in a surface of the center leaf spring 100. Therefore, it is possible to ensure rigidity of the center leaf spring 100. In addition, because separate shape processing is not required, it is possible to simplify the process and reduce the manufacturing costs.

The center cover 440 is separably mounted at the first side of the center accommodation part 420 to close the opened portion of the first side of the center accommodation part 420. Center cover through-holes 441 may be formed in the center cover 440, and the first center fastening parts 450 may be inserted into the center cover through-holes 441.

The first center fastening part 450 penetrates the center cover 440 and is fastened to the center accommodation part 420. The first center fastening part 450 may be configured as a screw, a bolt, or the like. The first center fastening part 450 penetrates the center cover through-hole 441 of the center cover 440 and is screw-fastened to the first center fastening hole 421 of the center accommodation part 420.

The center shim fastening part 460 penetrates the center accommodation part 420 and is fastened to the center shim 430. The center shim fastening part 460 may be configured as a screw, a bolt, or the like. The center shim fastening part 460 penetrates the second center through-hole 423 of the center accommodation part 420 and is fastened to the center shim 430. The center shim fastening part 460 may be fastened to the center shim 430 without being fastened directly to the center leaf spring 100, which makes it possible to prevent the center leaf spring 100 from being damaged by fastening with the center shim fastening part 460. The center shim 430 may press the center leaf spring 100 from below, thereby fixing the position of the center leaf spring 100 in the center accommodation part 420 and preventing the center leaf spring 100 from separating outward from the center accommodation part 420.

The center bracket 400 may further include a center stopper 470. The center stopper 470 is formed on the center connection plate 427 of the center accommodation part 420 and prevents the center leaf spring 100 from moving toward the center connection plate 427. That is, the center stopper 470 restricts an excessive movement of the center leaf spring 100 in one direction (a leftward direction based on FIG. 6) and prevents damage to upper and lower sides of an end of the center leaf spring 100.

The center stopper 470 may include a center protrusion 471 and center grooves 473. The center protrusion 471 protrudes in a direction toward the center leaf spring 100 from the center connection plate 427 of the center accommodation part 420 and restricts the movement of the center leaf spring 100 by coming into contact with a central portion of the end of the center leaf spring 100. The center protrusion 471 may be provided as one or more protrusions.

When the center leaf spring 100 comes into contact with the center protrusion 471, the center leaf spring 100 cannot move any further in one direction (the leftward direction based on FIG. 6). The end of the center protrusion 471 may be rounded to prevent damage to the center leaf spring 100.

The center groove 473 is recessed toward the center bracket body 410 from the center protrusion 471 and does not come into contact with the end of the center leaf spring 100. The center groove 473 is recessed so as not to come into contact with the end of the center leaf spring 100 and thus may prevent damage to the upper and lower sides of the end of the center leaf spring 100. In the present embodiment, the center grooves 473 are respectively formed in a connection portion between the center upper plate 426 and the center connection plate 427 and a connection portion between the center lower plate 428 and the center connection plate 427.

An interval between the lower surface of the center upper plate 426 and the upper surface of the center shim 430 disposed on the center lower plate 428 is smallest in an inlet 420a of the center accommodation part 420, and the interval increases toward an inner side of the center accommodation part 420 (in the leftward direction based on FIG. 6).

Referring to FIG. 6, an interval between the lower surface of the center upper plate 426 and the upper surface of the center shim 430 at the right adjacent to the center leaf spring 100 is smaller than an interval between the lower surface of the center upper plate 426 and the upper surface of the center shim 430 at the left side adjacent to the side leaf spring 200 (see FIG. 5). Therefore, in the case of the center leaf spring 100 accommodated in the center accommodation part 420, a vertical thickness of a portion (a right portion based on FIG. 6) of the center leaf spring 100, which is adjacent to the inlet of the center accommodation part 420, is smaller than a vertical thickness of a portion (a left portion based on FIG. 6) of the center leaf spring 100 that is adjacent to an innermost side of the center accommodation part 420.

The lower surface of the center upper plate 426 may be inclined downward at a first preset angle θ1 toward the inlet 420a of the center accommodation part 420. The upper surface of the center leaf spring 100 may be inclined upward at the first preset angle θ1 toward the innermost side of the center accommodation part 420 so as to correspond to the lower surface of the center upper plate 426.

The center upper plate 426 of the center accommodation part 420 inclined at the first preset angle θ1 and the center leaf spring 100 inclined at the first preset angle θ1 are in contact with each other, which makes it possible to prevent the center leaf spring 100 from moving toward the inlet 420a of the center accommodation part 420 in the center accommodation part 420.

In the present disclosure, the first preset angle θ1 may be set to 4°. When the center leaf spring 100 comes into contact with the center protrusion 471 of the center stopper 470, the center leaf spring 100 is prevented from moving toward the inner side of the center accommodation part 420. When the center leaf spring 100 comes into contact with the inner surface of the center accommodation part 420, the center leaf spring 100 is prevented from moving toward the inlet 420a of the center accommodation part 420. Therefore, the leftward/rightward movement of the center leaf spring 100 in the center accommodation part 420 may be restricted, and the position of the center leaf spring 100 may be stably fixed.

A vertical thickness of a portion of the center shim 430, which is adjacent to the inlet of the center accommodation part 420, may be larger than a vertical thickness of a portion of the center shim 430 that is adjacent to the inner side of the center accommodation part 420. The upper surface of the center shim 430 may be inclined upward at a preset angle toward the inlet 420a of the center accommodation part 420. The lower surface of the center leaf spring 100 may be inclined downward toward the innermost side of the center accommodation part 420 at the same preset angle as the upper surface of the center shim 430 so as to correspond to the upper surface of the center shim 430.

Referring to FIGS. 3 to 5 and 7, the side bracket 500 includes a side bracket body 510, a side accommodation part 520, a side shim 530, and a side cover 540.

The side bracket body 510 is connected to the center bracket 400. The side bracket body 510 may be separably coupled to the center bracket body 410 by the fastening part 600.

The side accommodation part 520 may be provided on the side bracket body 510. The side accommodation part 520 may be integrated with the side bracket body 510. The side accommodation part 520 may be manufactured separately from the side bracket body 510 and then separably coupled to the side bracket body 510.

The side accommodation part 520 may be disposed on a portion of the side bracket body 510 directed toward the side leaf spring 200. Therefore, based on FIG. 2, the side accommodation part 520 is disposed at a left side of the side bracket body 510 of the side bracket 500 at the left side, and the side accommodation part 520 is disposed at a right side of the side bracket body 510 of the side bracket 500 at the right side.

The side accommodation part 520 has therein a space that accommodates an end (a right end based on FIG. 7) of the side leaf spring 200.

The side accommodation part 520 has a first side (a front side based on FIG. 7) opened so that the side leaf spring 200 is inserted into the side accommodation part 520. Therefore, the side leaf spring 200 may be inserted into the side accommodation part 520 through the first side of the side accommodation part 520. A side (a rear side based on FIG. 7) of the side accommodation part 520 opposite to the first side is closed. Therefore, a further movement of the side leaf spring 200 inserted into the side accommodation part 520 is blocked by the side opposite to the first side.

The side accommodation part 520 has a second side (a left side based on FIG. 7) directed toward the side leaf spring 200, and the second side is opened. Therefore, the remaining portion of the side leaf spring 200 may be disposed to protrude outward from the side accommodation part 520 in the state in which the end of the side leaf spring 200 is accommodated in the side accommodation part 520. A side (a right side based on FIG. 7) of the side accommodation part 520 opposite to the second side is closed. Therefore, an excessive movement of the side leaf spring 200 inserted into the side accommodation part 520 is blocked by the side opposite to the second side.

The side accommodation part 520 may have a cross-sectional shape made by cutting the first and second sides, and the cross-sectional shape may be an approximately "└" shape. The side accommodation part 520 may include a side upper plate 526, a side lower plate 528 disposed to be spaced apart from the side upper plate 526, and a side connection plate 527 configured to connect the side upper plate 526 and the side lower plate 528.

The side upper plate 526 extends outward from an upper portion of the side connection plate 527, and the side lower plate 528 extends outward from a lower portion of the side connection plate 527. The side upper plate 526 and the side lower plate 528 may be disposed to be approximately parallel to each other and inclined at a predetermined angle.

The side bracket 500 may further include first side fastening parts 550 and side shim fastening parts 560. First side fastening holes 521 may be formed in the first side of the side accommodation part 520 and screw-fastened to the first side fastening parts 550. Second side through-holes (not illustrated) may be formed in a lower surface of the side accommodation part 520, and the side shim fastening parts 560 may be inserted into the second side through-holes.

The side leaf spring 200 is inserted into the opened first side of the side accommodation part 520, such that the side leaf spring 200 is inserted into the side accommodation part 520.

The side shim 530 is accommodated in the side accommodation part 520 so as to be in contact with a lower surface of the side leaf spring 200. The side shim 530 is disposed on the side lower plate 528 of the side accommodation part 520. That is, when the side leaf spring 200 and the side shim 530 are accommodated in the side accommodation part 520, the side shim 530 is disposed on the side lower plate 528 of the side accommodation part 520, and the side leaf spring 200 is disposed on the side shim 530. An upper surface of the side leaf spring 200 adjoins a lower surface of the side upper plate 526 of the side accommodation part 520.

Side shim fastening holes (not illustrated) may be formed in the side shim 530 and disposed to overlap the second side through-holes of the side accommodation part 520, and the side shim fastening parts 560 may be screw-fastened to the side shim fastening holes. A screw thread may be formed on an inner peripheral surface of the side shim fastening hole of the side shim 530 and screw-fastened to the side shim fastening part 560.

The side shim 530 inserted and mounted into the side accommodation part 520 is fastened to the side shim fastening part 560, such that the side leaf spring 200 may be stably accommodated in the side accommodation part 520 without a through-hole.

That is, a pressing force of the side shim 530 fastened to the side shim fastening part 560 fixes a position of the side leaf spring 200 in the side accommodation part 520 while restricting the upward/downward movement of the side leaf spring 200 in the side accommodation part 520.

Therefore, the side leaf spring 200 may be fixed in position in the side accommodation part 520 without being coupled directly to the side shim fastening part 560, such that a separate shape such as a fastening hole or a fastening groove need not be provided in a surface of the side leaf spring 200. Therefore, it is possible to ensure rigidity of the side leaf spring 200. In addition, because separate shape processing is not required, it is possible to simplify the process and reduce the manufacturing costs.

The side cover 540 is separably mounted at the first side of the side accommodation part 520 to close the opened portion of the first side of the side accommodation part 520. Side cover through-holes (not illustrated) may be formed in the side cover 540, and the first side fastening parts 550 may be inserted into the side cover through-holes.

The first side fastening part 550 penetrates the side cover 540 and is fastened to the side accommodation part 520. The first side fastening part 550 may be configured as a screw, a bolt, or the like. The first side fastening part 550 penetrates the side cover through-hole of the side cover 540 and is screw-fastened to the first side fastening hole 521 of the side accommodation part 520.

The side shim fastening part 560 penetrates the side accommodation part 520 and is fastened to the side shim 530. The side shim fastening part 560 may be configured as a screw, a bolt, or the like. The side shim fastening part 560 penetrates the second side through-hole of the side accommodation part 520 and is fastened to the side shim 530. The side shim fastening part 560 may be fastened to the side shim 530 without being fastened directly to the side leaf spring 200, which makes it possible to prevent the side leaf spring 200 from being damaged by fastening with the side shim fastening part 560. The side shim 530 may press the side leaf spring 200 from below, thereby fixing the position of the side leaf spring 200 in the side accommodation part 520 and preventing the side leaf spring 200 from separating outward from the side accommodation part 520.

The side bracket 500 may further include a side stopper 570. The side stopper 570 is formed on the side connection plate 527 of the side accommodation part 520 and prevents the side leaf spring 200 from moving toward the side connection plate 527. That is, the side stopper 570 restricts an excessive movement of the side leaf spring 200 in one direction (a rightward direction based on FIG. 7) and prevents damage to upper and lower sides of an end of the side leaf spring 200.

The side stopper 570 may include a side protrusion 571 and side grooves 573. The side protrusion 571 protrudes in a direction toward the side leaf spring 200 from the side connection plate 527 of the side accommodation part 520 and restricts the movement of the side leaf spring 200 by coming into contact with a central portion of the end of the side leaf spring 200. The side protrusion 571 may be provided as one or more protrusions.

When the side leaf spring 200 comes into contact with the side protrusion 571, the side leaf spring 200 cannot move any further in one direction (the rightward direction based on FIG. 7). The end of the side protrusion 571 may be rounded to prevent damage to the side leaf spring 200.

The side groove 573 is recessed toward the side bracket body 510 from the side protrusion 571 and does not come into contact with the end of the side leaf spring 200. The side groove 573 is recessed so as not to come into contact with the end of the side leaf spring 200 and thus may prevent damage to the upper and lower sides of the end of the side leaf spring 200.

In the present embodiment, the side grooves 573 are respectively formed in a connection portion between the side upper plate 526 and the side connection plate 527 and a connection portion between the side lower plate 528 and the side connection plate 527.

An interval between the lower surface of the side upper plate 526 and the upper surface of the side shim 530 disposed on the side lower plate 528 is smallest in an inlet 520a of the side accommodation part 520, and the interval increases toward an inner side of the side accommodation part 520 (in the rightward direction based on FIG. 7).

Referring to FIG. 7, an interval between the lower surface of the side upper plate 526 and the upper surface of the side shim 530 at the left side adjacent to the side leaf spring 200 is smaller than an interval between the lower surface of the side upper plate 526 and the upper surface of the side shim 530 at the right side adjacent to the center spring 100 (see FIG. 5). Therefore, in the case of the side leaf spring 200 accommodated in the side accommodation part 520, a vertical thickness of a portion (a left portion based on FIG. 7) of the side leaf spring 200, which is adjacent to the inlet of the side accommodation part 520, is smaller than a vertical thickness of a portion (a right portion based on FIG. 7) of the side leaf spring 200 that is adjacent to an innermost side of the side accommodation part 520.

The lower surface of the side upper plate 526 may be inclined downward at a second preset angle θ2 toward the inlet 520a of the side accommodation part 520. The upper surface of the side leaf spring 200 may be inclined upward at the second preset angle θ2 toward the innermost side of the side accommodation part 520 so as to correspond to the lower surface of the side upper plate 526.

The side upper plate 526 inclined at the second preset angle θ2 and the side leaf spring 200 inclined at the second preset angle θ2 are in contact with each other, which makes it possible to prevent the side leaf spring 200 from moving toward the inlet 520a of the side accommodation part 520 in the side accommodation part 520.

In the present disclosure, the second preset angle θ2 may be set to 2.4°. When the side leaf spring 200 comes into contact with the side protrusion 571 of the side stopper 570, the side leaf spring 200 is prevented from moving toward the inner side of the side accommodation part 520. When the side leaf spring 200 comes into contact with the inner surface of the side accommodation part 520, the side leaf spring 200 is prevented from moving toward the inlet 520a of the side accommodation part 520. Therefore, the leftward/rightward movement of the side leaf spring 200 in the side accommodation part 520 may be restricted, and the position of the side leaf spring 200 may be stably fixed.

A vertical thickness of a portion of the side shim 530, which is adjacent to the inlet of the side accommodation part 520, may be larger than a vertical thickness of a portion of the side shim 530 that is adjacent to the inner side of the side accommodation part 520. The upper surface of the side shim 530 may be inclined upward at a preset angle toward the inlet 520a of the side accommodation part 520. The lower surface of the side leaf spring 200 may be inclined downward toward the innermost side of the side accommodation part 520 at the same preset angle as the upper surface of the side shim 530 so as to correspond to the upper surface of the side shim 530.

According to the leaf spring device for a suspension system for a vehicle according to the embodiment of the present disclosure, the center bracket 400 for supporting the end of the center leaf spring 100 and the side bracket 500 for supporting the end of the side leaf spring 200 may reduce damage to the center leaf spring 100 and the side leaf spring 200.

In addition, according to the present disclosure, the center leaf spring 100 and the side leaf spring 200 are respectively supported by the center bracket 400 and the side bracket 500 without holes formed in the center leaf spring 100 and the side leaf spring 200, which makes it possible to improve durability of the center leaf spring 100 and the side leaf spring 200.

While the present disclosure has been described with reference to the exemplary embodiment depicted in the drawings, the exemplary embodiment is for illustrative purposes only, and those skilled in the art to the present technology pertains will understand that various modifications of the exemplary embodiment and any other exemplary embodiment equivalent thereto are available. Accordingly, the true technical protection scope of the present disclosure should be determined by the appended claims.

What is claimed is:

1. A leaf spring device for a suspension system for a vehicle, the leaf spring device comprising:

a center leaf spring;

side leaf springs respectively disposed at two opposite sides of the center leaf spring; and bracket modules, each of the bracket modules comprising a center bracket configured to accommodate an end of the center leaf spring, and a side bracket connected to the center bracket and configured to accommodate an end of a side leaf spring, wherein the center bracket and the side bracket are separate and rigidly coupled by a fastening part that prevents relative movement between the center bracket and the side bracket, wherein the center bracket comprises:

a center bracket body connected to the side bracket;

a center accommodation part disposed on the center bracket body and configured to accommodate the center leaf spring, the center accommodation part having a first side opened so that the center leaf spring is inserted into the center accommodation part;

a center shim accommodated in the center accommodation part and configured to adjoin the center leaf spring; and a center cover coupled to the center accommodation part by center fastening parts to close the opened first side of the center accommodation part, wherein the center cover includes center cover through holes, the center fastening parts are configured to be inserted into the center cover through holes and penetrate the center cover, wherein the center bracket further comprises a center shim fastening part configured to penetrate the center accommodation part and be fastened to the center shim so that the center shim presses the center leaf spring.

2. The leaf spring device of claim 1, wherein the center accommodation part comprises:

a center upper plate;

a center lower plate disposed to be spaced apart from the center upper plate; and a center connection plate configured to connect the center upper plate and the center lower plate, and wherein the center shim is disposed on the center lower plate.

3. The leaf spring device of claim 2, wherein an interval between an upper surface of the center shim and a lower surface of the center upper plate is smaller at an inlet of the center accommodation part than at an inner side of the center accommodation part.

4. The leaf spring device of claim 3, wherein a vertical thickness of a portion of the center leaf spring, which is adjacent to the inner side of the center accommodation part, is larger than a vertical thickness of a portion of the center leaf spring that is adjacent to the inlet of the center accommodation part.

5. The leaf spring device of claim 4, wherein a vertical thickness of a portion of the center shim, which is adjacent to the inlet of the center accommodation part, is larger than a vertical thickness of a portion of the center shim that is adjacent to the inner side of the center accommodation part.

6. The leaf spring device of claim 2, wherein the center bracket further comprises a center stopper formed on the center connection plate and configured to prevent the center leaf spring from moving toward an inner side of the center accommodation part.

7. The leaf spring device of claim 6, wherein the center stopper comprises:

a center protrusion protruding from the center connection plate toward the center leaf spring; and center grooves respectively formed in a connection portion between the center upper plate and the center connection plate and a connection portion between the center lower plate and the center connection plate.

8. The leaf spring device of claim 1, wherein the side bracket comprises:

a side bracket body connected to the center bracket;

a side accommodation part disposed on the side bracket body and configured to accommodate the side leaf spring, the side accommodation part having a first side opened so that the side leaf spring is inserted into the side accommodation part;

a side shim accommodated in the side accommodation part and configured to adjoin the side leaf spring; and a side cover coupled to the side accommodation part to close the first side of the side accommodation part.

9. The leaf spring device of claim 8, wherein the side bracket further comprises a side shim fastening part configured to penetrate the side accommodation part and be fastened to the side shim so that the side shim presses the side leaf spring.

10. The leaf spring device of claim 8, wherein the side accommodation part comprises:

a side upper plate;

a side lower plate disposed to be spaced apart from the side upper plate; and a side connection plate configured to connect the side upper plate and the side lower plate, and wherein the side shim is disposed on the side lower plate.

11. The leaf spring device of claim 10, wherein an interval between an upper surface of the side shim and a lower surface of the side upper plate is smaller at an inlet of the side accommodation part than at an inner side of the side accommodation part.

12. The leaf spring device of claim 11, wherein a vertical thickness of a portion of the side leaf spring, which is adjacent to the inner side of the side accommodation part, is larger than a vertical thickness of a portion of the side leaf spring that is adjacent to the inlet of the side accommodation part.

13. The leaf spring device of claim 12, wherein a vertical thickness of a portion of the side shim, which is adjacent to the inlet of the side accommodation part, is larger than a vertical thickness of a portion of the side shim that is adjacent to the inner side of the side accommodation part.

14. The leaf spring device of claim 10, wherein the side bracket further comprises a side stopper formed on the side connection plate and configured to prevent the side leaf spring from moving toward an inner side of the side accommodation part.

15. The leaf spring device of claim 14, wherein the side stopper comprises:

a side protrusion protruding from the side connection plate toward the side leaf spring; and side grooves respectively formed in a connection portion between the side upper plate and the side connection plate and a connection portion between the side lower plate and the side connection plate.

16. The leaf spring device of claim 1, wherein at least one of the center leaf spring, the side leaf spring, and a combination thereof includes glass fiber reinforced plastic (GFRP).

* * * * *